United States Patent [19]

Percec et al.

[11] Patent Number: 4,914,138

[45] Date of Patent: Apr. 3, 1990

[54] BLENDS OF HIGH NITRILE POLYMERS AND POLYOLEFINS AND METHOD FOR THE PREPARATION THEREON

[75] Inventors: Elena S. Percec, Pepper Pike; Lucy Melamud, Beachwood; Gerald P. Coffey, Lyndhurst, all of Ohio

[73] Assignee: The Standard Oil Company, Cleveland, Ohio

[21] Appl. No.: 234,912

[22] Filed: Aug. 22, 1988

[51] Int. Cl.$^4$ .................. C08L 51/06; C08L 33/20; C08L 51/04

[52] U.S. Cl. .................................. 525/71; 525/73; 525/74; 525/78

[58] Field of Search ............... 525/74, 73, 71, 78

[56] References Cited

U.S. PATENT DOCUMENTS

| | | | |
|---|---|---|---|
| 3,426,102 | 2/1969 | Solak et al. | 260/879 |
| 3,586,737 | 6/1971 | Duke et al. | 260/879 |
| 3,634,547 | 1/1972 | Brewster et al. | 260/876 R |
| 3,652,726 | 3/1972 | Nield et al. | 260/876 |
| 3,763,278 | 10/1973 | Griffith | 260/880 R |
| 3,766,142 | 10/1973 | Nield et al. | 260/47 UA |
| 3,914,337 | 10/1975 | Giddings et al. | 260/876 R |
| 3,954,913 | 5/1976 | Uebele et al. | 260/880 R |
| 3,962,371 | 6/1976 | Alberts et al. | 260/876 R |
| 4,153,648 | 5/1979 | Li et al. | 260/896 |
| 4,160,001 | 7/1979 | Rosen | 525/230 |
| 4,195,135 | 3/1980 | Li et al. | 525/69 |
| 4,299,931 | 11/1981 | Coran et al. | 525/95 |
| 4,307,207 | 12/1981 | Wiggins et al. | 525/66 |
| 4,397,987 | 8/1983 | Cornell | 525/75 |
| 4,588,774 | 5/1986 | Dean | 525/73 |
| 4,605,700 | 8/1986 | Le-Khac | 525/73 |

*Primary Examiner*—Carman J. Seccuro
*Attorney, Agent, or Firm*—Larry W. Evans; Joseph G. Curatolo; Sue E. Phillips

[57] ABSTRACT

A polymer blend comprises a high nitrile polymer and a compatible polyolefin functionalized with an unsaturated compound selected from the group consisting of unsaturated carboxylic acids, esters, anhydrides and imides. Such blends can be used to form films and membranes having improved thermal, mechanical and optical properties. The blend combines the low oxygen permeability of high nitrile polymers with the low water vapor permeability of the polyolefins and are, therefore, useful in the packaging industry. A method for forming blends of high nitrile polymers with polyolefins includes the step of functinalizing a polyolefin prepared from a monoolefin having from 2 to about 6 carbon atoms with an unsaturated compound selected from the group consisting of unsaturated carboxylic acids, esters, anhydrides and imides and blending from about 99 to 1 parts by weight of the functionalized polyolefin with from about 1 to 99 parts by weight of the high nitrile polymer.

33 Claims, No Drawings

BLENDS OF HIGH NITRILE POLYMERS AND POLYOLEFINS AND METHOD FOR THE PREPARATION THEREON

TECHNICAL FIELD this invention relates to blends of high nitrile polymers, such as acrylonitrile methyl acrylate copolymer with various polyolefins which permit the incorporation of the desirable characteristics of each component polymer or copolymer into a single material. Accordingly, improvements in thermal resistance, strength, optical clarity and processability can be imparted to high nitrile polymers. The nitrile polymers, in turn, impart significant barrier enhancement for many polyolefins that are otherwise recognized as permeable materials. Films of these blends, which display the ability to restrict the passage of gases, vapors and organic liquids, find utility in packaging applications and as membrane materials. Moreover, the blends afford the opportunity of employing low cost materials with more costly polymers having a desired property. A method for the formation of blends comprising high nitrile polymers with polyolefins is also provided.

BACKGROUND OF THE INVENTION

Because the main reason for polymer blending is to create products with desirable properties in an economical fashion, the relatively low cost and availability of polyolefins make them very attractive in creating new materials. Polyolefins are recognized for their many and varied properties such as relative inertness, structural strength and flexibility even at low temperatures. Additionally, polyolefins display a high ability to restrict the passage of water vapor and therefore they are utilized in the packaging industry. However, polyolefins are not suitable to applications requiring stringent gas barrier protection. On the other hand, other polymers such as high nitrile polymers, those with an acrylonitrile content above 70 percent, are excellent gas barriers and they have modes water vapor-barrier properties.

Accordingly, it would be highly advantageous if the most desirable characteristics of each of these types of polymers could be incorporated into a single material. The practical way of combining high nitrile polymers and polyolefins is not easily accessible because they are regarded as incompatible materials in that they have dissimilar polarities. By blending, these polymers form high phase separated systems exhibiting low interfacial adhesion between phases and consequently poor transfer of mechanical stress.

Many of the patents that are known provide polymer blend compositions wherein one component is a graft copolymer which can contain an olefin or diene rubber. Although olefins and acrylonitrile are present in the compositions, they are generally not blended together as separate polymers.

U.S. Pat. No. 3,634,547, for instance, is directed toward graft copolymers which comprise a diene rubber copolymer substrate and a superstrate comprising acrylonitrile, a vinyl ether and optionally, an N-aryl maleimide. These graft copolymers can be blended with a resin containing acrylonitrile and and ethylenically unsaturated comonomer including alkenes and optionally, an N-aryl maleimide. The blend compositions have high tensile strength and improved impact resistance.

U.S. Pat. No. 3,652,726 discloses similar blends of graft copolymers and coploymer resins. The graft copolymer contains at least one percent of N-aryl maleimide and it also contains an aromatic olefin such as styrene. The copolymer resins include acrylonitrile/aromatic olefin resins; blends of the graft copolymer and various compatible resins such as ABS; and blends of acrylonitrile, N-aryl maleimide and an aromatic olefin with an ABS graft copolymer. These compositions exhibit comparable properties as appear in the preceding patent, and they possess high softening points.

U.S. Pat. No. 3,962,371 provides thermoplastic molding compounds comprising mixtures of first, a copolymer of acrylonitrile, at least one aromatic vinyl compound and optionally, a monoolefin and second, a graft copolymer of an ethylene/vinyl ester copolymer as a substrate and grafted units comprising acrylonitrile, a vinyl aromatic compound and optionally, a monoolefin.

U.S. Pat. No. 4,397,987 is directed toward oil resistant and ozone resistant polymer blends comprising blends of acrylonitrile/butadiene rubber with an EPDM rubber containing graft branches of poly(methyl methacrylate).

U.S. Pat. No. 4,409,365 is directed toward thermoplastic rubber blends comprising first, a blend of a crystalline polyolefin resin with vulcanized EPDM rubber and second, a blend of crystalline polyolefin resin with a vulcanized nitrile rubber. The latter nitrile rubbers comprise copolymers of 1,3-butadiene or isoprene and acrylonitrile which are preferably "functionalized" with one or more graft forming functional groups. Such groups include carboxy groups and amino groups. The patent also discloses the use of maleic acid modified polypropylene in the blend with the functionalized nitrile rubber.

U.S. Pat. No. 4,588,774 discloses another thermoplastic composition comprising a terpolymer of methyl methacrylate, N-aryl substituted maleimide and a vinyl aromatic monomer, with an acrylonitrile copolymer grafted onto polybutadiene rubber.

U.S. Pat. No. 4,605,700 is directed to a similar composition as set forth in the preceding patent which employs a copolymer comprising an olefin and an N-aryl substituted maleimide in lieu of the terpolymer.

While these patents disclose blends of mixtures of polymers, one of which is an acrylonitrile polymer, the blends do not necessarily disclose high acrylonitrile containing copolymers. Such polymers are described in detail in U.S. Pat. Nos. 3,426,102, 3,586,737 and 3,763,278 owned by the Assignee of record herein. They are basically thermoplastic polymer compositions containing at least 70 percent by weight of an unsaturated mononitrile, an ester of an olefinically unsaturated carboxylic acid and a rubbery copolymer of a conjugated diene and styrene or an olefinically unsaturated nitrile.

Blends of other thermoplastic polymers with these polymers are described in five U.S. patents also owned by the Assignee of record herein. U.S. Pat. No. 3,914,337, for instance, disclosed blends of high acrylonitrile copolymers with resinous copolymers of acrylonitrile and styrene. U.S. Pat. Nos. 4,153,648 and 4,195,135 disclose blends of high acrylonitrile copolymers with acrylonitrileindene copolymers. U.S. Pat. No. 4,160,001 discloses blends of high acrylonitrile copolymers with a copolymers with a copolymer of methyl methacrylate and styrene. U.S. Pat. No.

4,307,207 discloses blends of high acrylonitrile copolymers with hydrophobic nylon.

The blends with nylon exhibit improved impact resistance and are useful in a variety of thermoformed articles. The other blends have improved gas barrier properties and other mechanical properties making them suitable as packaging materials.

Despite the existence of many blends involving acrylonitrile polymers with other polymers, the foregoing patents do not disclose blends comprising high acrylonitrile polymers with polyolefins.

DISCLOSURE OF THE INVENTION

It is, therefore, an object of the present invention to provide compatible/miscible polymer blends comprising high acrylonitrile polymers and various other polyolefins.

It is another object of the present invention to provide compatible/miscible polymer blends having improved thermal, mechanical and optical properties.

It is yet another object of the present invention to provide compatible/miscible polymer blends that contain low cost polymer components and which exhibit improved processability.

It is a further object of the present invention to provide compatible/miscible polymer blends which can be employed to form films and membranes that have limited or restricted permeability to gases, vapors and organic liquids.

It is further still an object of the present invention to provide a method for forming blends of high acrylonitrile polymers and polyolefins.

Thee and other objects, together with the advantages thereof over known polymer blends, which shall become apparent from the specification which follows, are accomplished by the invention as hereinafter described and claimed.

In general, a polymer blend according to the present invention comprises from about 1 to 99 parts by weight of a high nitrile polymer produced by polymerizing a major proportion of a monounsaturated nitrile, a minor proportion of another monovinyl monomer copolymerizable therewith optionally in the presence of a diene rubber, and from about 99 to 1 parts by weight of a polyolefin, prepared from a monoolefin having from 2 to about 6 carbon atoms and functionalized with an unsaturated compound selected from the group consisting of unsaturated carboxylic acids, esters, anhydrides and imides.

The present invention also provides a polymer blend comprising from about 1 to 99 parts by weight of a high nitrile polymer produced by polymerizing a major proportion of a monounsaturated nitrile, a minor proportion of another monovinyl monomer copolymerizable therewith optionally in the presence of a diene rubber, and from about 99 to 1 parts by weight of poly(ethylene-co-maleic anhydride).

Finally, the present invention provides a method for forming blends of high nitrile polymers with polyolefins comprising the steps of functionalizing a polyolefin prepared from a monoolefin having from 2 to about 6 carbon atoms with an unsaturated compound selected from the group consisting of unsaturated carboxylic acids, esters, anhydrides and imides and blending from about 99 to 1 parts by weight of the functionalized polyolefin with from about 1 to 99 parts by weight of the high nitrile polymer.

PREFERRED EMBODIMENT FOR CARRYING OUT THE INVENTION

The polymer blends of the present invention comprise a mixture of two or more polymers. One is always a high nitrile polymer by which is meant more than about 50 percent by weight of the polymer is a nitrile polymer. The other is a polyolefin which will be discussed hereinbelow.

More particularly, the nitrile polymers useful in this invention are those produced by polymerizing a major proportion of a monounsaturated nitrile, e.g., acrylonitrile, and a minor proportion of another monovinyl monomer component copolymerizable therewith, optionally in the presence of a diene rubber which may be a homopolymer or copolymer of a conjugated diene monomer.

The high nitrile polymer compositions of the present invention can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen.

The olefinically unsaturated nitriles used in the present invention are the alpha, beta-olefinically unsaturated mononitriles having the structure:

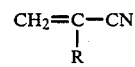

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers, and others.

The esters of olefinically unsaturated carboxylic acids include those having the structure:

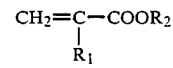

wherein $R_1$ is hydrogen, an alkyl group having from 1 to 6 carbon atoms, or a halogen, and $R_2$ is an alkyl group having from 1 to 30 carbon atoms. Compounds of this type include methyl acrylate, ethyl acrylate, the propylacrylates, the butyl acrylates, and amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

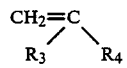

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, 2,4,4-trimethyl pentene-1 and the like and mixtures thereof. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrate and the like. Most preferred is vinyl acetate. The vinyl aromatic monomers include styrene, alpha-methyl styrene, the vinyl toluenes, the vinyl xylenes, indene and the like. Most preferred is styrene.

The olefinic nitrile copolymer is optionally polymerized in the presence of a preformed diene rubber which may be a homopolymer or copolymer of a conjugated diene monomer. These monomers include 1,3-butadiene, isoprene, chloroprene, bromoprene, cyanoprene, 2,3-dimethyl 1,3-butadiene, 2-ethyl 1,3-butadiene, 2,3-diethyl 1,3-butadiene and the like. Most preferred for the purpose of this invention are 1,3-butadiene and isoprene because of their ready availability and their excellent polymerization properties.

The conjugated diene monomer may be copolymerized with a comonomer selected from the group consisting of vinyl aromatic monomer, an olefinic nitrile monomer having the structure:

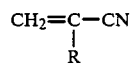

wherein R has the foregoing designation, and an ester having the structure:

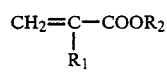

wherein $R_1$ and $R_2$ have the foregoing designations. The rubbery polymer contains from 50 percent to 100 percent by weight of polymerized conjugated diene monomer and from 0 percent to 50 percent by weight of a comonomer.

Preferred polymers useful in this invention are those prepared by the polymerization of 100 parts by weight of (A) from 60 percent to 90 percent by weight of at least one nitrile having the structure:

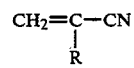

wherein R has the foregoing designation and (B) from 10 percent to 40 percent by weight based on the combined weights of (A) and (B) of at least one member selected from the group consisting of an ester having the structure:

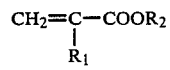

wherein $R_1$ and $R_2$ have the foregoing respective designations; and alpha-olefins having the structure:

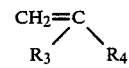

wherein $R_3$ and $R_4$ have the foregoing respective designations; a vinyl ether selected from the group consisting of methyl vinyl ether, ethyl vinyl ethers, the propyl vinyl ethers, and the butyl vinyl ethers; vinyl acetate; styrene and indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure:

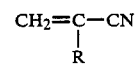

wherein R has the foregoing designation, and an ester having the structure:

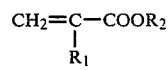

wherein $R_1$ and $R_2$ have the foregoing respective designations, said rubbery polymer containing from 50 percent to 100 percent by weight of polymerized conjugated diene and from 0 percent to 50 percent by weight of a comonomer.

The most preferred nitrile polymers are prepared by the polymerization of between 70 and 80 parts by weight of (A) and 20 to 30 parts by weight of (B) in the presence of from 5 to 15 parts by weight of (C).

Thermoplastic high nitrile resins of at least 70 percent by weight of a monounsaturated nitrile and up to 30 percent by weight of at least one other comonomer and which may also be rubber modified have previously been described in U.S. Pat. Nos. 3,426,102, 3,586,737, 3,763,278, the subject matter of which is incorporated herein by reference. These polymers have excellent barrier properties and can be molded into containers, pipes, films, sheets and the like, to be used for packaging solids, liquids and gases of various types.

As noted hereinabove, blends of high nitrile polymers and polyolefins are generally recognized to be incompatible because of a high degree of phase separation. For components with such low affinity to each other, the melt interfacial tension is high and a fine dispersion of phases has been difficult to achieve.

We have found that polyolefin functionalization with polar moieties leads to compatibilization with high nitrile polymers. More particularly, at the molecular level, functional groups, inserted on polyolefin chains, give rise to molecular interactions with reactive sites of high nitrile polymer chains. These interactions are believed to be responsible for the compatibility of the blends.

Suitable polyolefins are formed from alpha-monoolefin monomers having from 2 to about 6 carbon atoms. Representative examples include poly(ethylene) or PE; poly(propylene) or PP and poly(ethylene-co-propylene) or PEP. The polyolefins can be functionalized or modified with unsaturated compounds such as unsaturated carboxylic acids, esters, anhydrides and imides and include, for instance, acrylic and methacrylic acid; acrylates and methacrylates; maleic anhydride; maleic acid; fumaric acid; N-phenylmaleimide and the like. The functionalization of polyolefins with such molecules bearing polar groups can be performed by means of copolymerization or grafting reactions promoted by radical initiators. Functionalized polymers include copolymers of the polyolefins with polymers formed from the above-referenced unsaturated monomers; the unsaturated monomers may also be polymerized to form graft branches from the polyolefin and, the unsaturated compounds themselves can be grafted onto the polyolefin, forming reactive sites rather than graft polymer branches. Accordingly, representative functionalized polyolefins include poly(ethylene-comaleic anhydride) or PEMA; poly(ethylene-g-maleic anhydride) or PE-g-MA; and poly(propylene) grafted with acrylic acid or PP-g-AcA.

Ternary blends can also be formed, based on the foregoing binary blends, which contain a third or ternary unfunctionalized polyolefin as above, being formed from a monomer having 2 to about 6 carbon atoms or, a different, functionalized polyolefin as above, that is, being formed from a monomer having 2 to about 6 carbon atoms and functionalized with one of the foregoing unsaturated compounds.

Depending upon the composition, blends of high nitrile polymers and functionalized polyolefins can exhibit a single glass transition temperature (Tg) or two Tg's intermediate to those of the pure components. Binary blends prepared from high nitrile polymers and poly(ethylene-co-maleic anhydride) PEMA are transparent and have outstanding barrier properties. They can be used in packaging applications and related industries. Additionally, binary and ternary blends exhibit properties such as improved thermal resistance, strength, optical clarity and processability.

While the polymer blends of the present invention possess good to outstanding gas barrier properties, water vapor resistance can be improved also by the incorporation of various materials that function as drying agents. This is particularly useful in blends of nitrile polymers with PEMA which would have utility in aqueous packaging environments including food and non-food applications. Suitable drying agents include, for instance, $Na_2HPO_4$, $NaH_2PO_4$, $CaCl_2$, $CaSO_4$, $MgSO_4$ and the like. These are added in small amounts, on the order of about 1 to 10 percent by weight, based upon 100 parts of polymer weight, and are added with the functionalized polyolefin.

As noted hereinabove, in order to prepare the blends of the present invention, it is necessary to functionalize the polyolefin. This can be accomplished by a grafting procedure. Solution grafting, for instance, involves forming a solution of the polyolefin followed by the addition of the unsaturated monomer and a free radical initiator such as dicumyl peroxide. Functionalized polyolefins can also be prepared by adding the unsaturated monomer and a free radical initiator to the molten polyolefin in a suitable device such as an extruder.

Ethylene-maleic anhydride copolymer (PEMA) is a functionalized polyolefin which can also be prepared by reacting ethylene and maleic anhydride in an autoclave with or without a solvent such as toluene at a temperature of 85° to 100° C. in the presence of benzoyl peroxide and at pressures of 860 to 950 atmospheres (87.2 to 96.3 MPa). Of course, it should be appreciated by those skilled in the art that other procedures can be employed to functionalize the polyolefin.

Blends of the high nitrile polymer and functionalized polyolefin can comprise from about 1 to 99 parts by weight of the high nitrile copolymer and from about 99 to 1 parts by weight of the functionalized polyolefin. Additionally, from about 5 to 95 parts by weight of a functionalized or unfunctionalized ternary polyolefin, such as PE or PP, can be added to form a ternary blend with a corresponding decrease in the amount of one or both of the binary components to provide 100 parts by weight of the three polymers. Blends of high nitrile polymers and functionalized polyolefins such as poly(ethylene-co-maleic anhydride) are prepared by conventional solution or melt blending, the latter being preferred. For solution blending a mutual solvent such as dimethylformamide (DMF) or N,N-dimethylacetamide (DMAC) and the like is selected to which the polymers are added. Mixing occurs at ambient pressure and temperature for a time of from about 1 to 6 hours. Polymer films can be subsequently formed by casting, evaporation of the solvent and drying, as is known in the art For melt blending, the polymer components can be combined in a Brabender Plasticorder at temperatures of about 180° C., or the necessary temperature to melt the components. Films can be prepared by compression molding at about 180° C., followed by slow cooling to ambient temperature.

In the work reported hereinbelow, plaques and films of high nitrile polymers and ethylene-maleic anhydride copolymer were prepared by melt blending and found to exhibit excellent optical clarity. Moreover, the optical appearance of the films remained about the same over the entire range of composition of the blend. The optimum processing temperature was found to be about 210° C.

In order to demonstrate practice of the present invention, several blends of the high acrylonitrile copolymer Barex 210 (B-210) with varying amounts of polyolefins that were prepared and evaluated have been reported hereinbelow. Barex 210, a trade name for the commercial product of BP America, Inc., a subsidiary of British Petroleum Company, is a poly(acrylonitrile-methyl acrylatebutadiene) polymer (70:21:9, parts b weight) having a number average molecular weight of 50,000. The polymers PE and PP and the copolymer PEMA were obtained from Aldrich Chemical Co. The polymer PP-g-AcA, having a degree of grafting equal to or less than 6 percent, is produced by BP Performance Polymers and is available under the trade name Polybond.

The polymer PE-g-MA was synthesized by grafting according to the following procedure. In a flask equipped with a nitrogen inlet and a condenser 5.0 g of high density polyethylene were dissolved in anhydrous xylene at 80° C. When dissolution was complete, the temperature was allowed to rise to 140° C. and 10 g of maleic anhydride was added to the system together with 0.5 g of dicumyl peroxide dissolved in 10 ml of anhydrous xylene. After 3 hours the reaction was stopped and the grafted polymer, poly(ethylene-g-maleic anhydride) was precipitated in acetone and repeatedly washed with acetone. The obtained polymer was dried in a vaccum over for 48 hours at 50° C. The degree of grafting, estimated from IR spectroscopic data was 1 to 2.5 percent.

All polymers were used without further purification. In several instances, quantities of polyethylene (PE) or polypropylene (PP) were added to make a ternary blend. The blends were prepared by melt mixing in a torque rheometer (C. W. Brabender Inc. model EPL-V5501) at 180° C. Films were obtained by compression molding the melt in a Carver press set at 180° C. followed by slow cooling to room temperature. The calorimetric studies were conducted on a Perkin Elmer differential scanning calorimeter, model DSC-4, equipped with a computerized data station; thermograms were recorded at a heating rate of 20° C./min in the region of 30° to 200° C. and, the glass transition temperature (Tg) was defined as the midpoint of the change in heat capacity. The thermal behavior of these blends was determined and is reported in Tables I-V. Glass transition temperatures (tg) and melting temperatures (Tm) are reported. The blends, in terms of various weight fractions, e.g., 95/5, B-210/PEMA or the like, appear between the first and last entry of each Table.

Blends of B-210 and PEMA

The variation of the glass transition temperature (Tg) with the composition of the blends prepared from B-210 PEMA is presented in Table I. Optical observations of these films indicated transparency over the entire range of composition studied. All of the compositions exhibited a single glass transition temperature that denoted very good mixing of the polymer pair.

TABLE I

| Glass Transition Temperatures of B-210 and PEMA | | |
|---|---|---|
| Ex. No. | B-210/PEMA | Tg (°C.) |
| 1 | 100/0 | 86.0 |
| 2 | 95/5 | 86.4 |
| 3 | 90/10 | 87.4 |
| 4 | 75/25 | 92.8 |
| 5 | 50/50 | 94.9 |
| 6 | 25/75 | 111.0 |
| 7 | 10/90 | 135.0 |
| 8 | 0/100 | 143.7 |

Blends of B-210 and PP-g-AcA

Binary blends of B-210 and PP-g-AcA have been prepared over a limited range of compositions. Their thermal behavior is summarized in Table II. Although the Tg of binary compositions containing less than 10 percent of PP-g-AcA cannot be taken as sufficient evidence to show the miscible nature of their amorphous mixed phase, there are other indications to suggest that they are miscible. As the content of PP-g-AcA increased, no multiple amorphous phases were observed and the Tg of the single amorphous phase continued to decline. For instance, where PP-g-AcA was present in 75 percent of the blend, the glass transition of the amorphous phase occurred at 83° C. In respect to the melting behavior of the crystalline phase, a decrease in the melting temperature of a few degrees was observed for compositions containing a small amount of PP-g-AcA.

TABLE II

| The Thermal Behavior of Blends of B-210 and PP-g-AcA | | | |
|---|---|---|---|
| Ex. No. | B-210-PP-g-AcA | Tg (°C.) | Tm (°C.) |
| 1 | 100/0 | 86.0 | — |
| 9 | 95/5 | 86.6 | 159.3 |
| 10 | 90/10 | 85.0 | 157.9 |
| 11 | 80/20 | 85.5 | 160.3 |
| 12 | 25/75 | 83.7 | 164.3 |
| 13 | 0/100 | 58.3 | 164.0 |

Blends of B-210 and PE-g-MA

The thermal behavior of blends consisting of B-210 and PE-g-MA is presented in Table III. The Tg of the blends decreased with the increase of the PE-g-MA component. The depression of the melting temperature of the PE-g-MA crystalline phase in these blends was also observed.

TABLE III

| Glass Transition Temperature and Melting Behavior of Blends of B-210 and PE-g-MA | | | |
|---|---|---|---|
| Ex. No. | B-210/PE-g-MA | Tg (°C.) | Tm (°C.) |
| 1 | 100/0 | 86.0 | — |
| 14 | 90/10 | 85.5 | 122.5 |
| 15 | 75/25 | 83.9 | 123.0 |
| 16 | 50/50 | | |
| 17 | 25/75 | | |
| 18 | 10/90 | | |
| 19 | 0/100 | — | 125.0 |

TERNARY BLEND SYSTEMS

Blends of B-210, PEMA and PE

Ternary blends consisting of B-210, PEMA and PE have also been considered. Several compositions and their thermal behavior are shown in Table IV. For the 80/10/10 B-210/PEMA/PE blend, Example 21, one single Tg was recorded at 89.6° C. which is intermediate to that of B-210 and PEMA. The melting occurring at 128.8° C. was due to the PE component. For the 10/10/80 B-210/PEMA/PE composition, Example 22, the melting of the PE component was clearly observed at 132.0° C. However, since in this composition B-210 and PEMA were minor components, their thermal behavior either as a blend or as pure components could not be identified.

TABLE IV

| Thermal Behavior of Blends of B-210, PEMA and PE | | | | |
|---|---|---|---|---|
| Ex. No. | Polymer System | Composition | Tg (°C.) | Tm (°C.) |
| 1 | B-210 | 100 | 86.03 | — |
| 8 | PEMA | 100 | 143.72 | — |
| 20 | PE[a] | 100 | — | 133.68 |
| 21 | B-210/PEMA/PE | 80/10/10 | 89.57 | 128.8 |
| 22 | B-210/PEMA/PE | 10/10/80 | — | 132.02 |

[a]Because the thermal behavior was studied in a temperature range from 20° C. to 210° C. the Tg of the amorphous (linear or branched) PE could not be observed

Blends of B-210, PP and PP-g-AcA

The DSC study of ternary blends of B-210, PP and PP-g-AcA indicated the multiphase nature of this system and is reported in Table V. Smaller variations of the values of Tg and Tm were recorded if they compared with those of binary B-210/PP-g-AcA blends. Due to the high level of crystallinity of isotactic PP and the low level of amorphous isotactic PP, it should be recognized that a Tg for the amorphous PP fraction could not be detected.

TABLE V

Glass Transition Temperature and Melting Behavior of Blends of B-210,PP and PP-g-AcA

| Ex. No. | B-210/PP/PP-g-AcA | Tg (°C.) | Tm (°C.) |
|---|---|---|---|
| 23 | 100/0/0 | 86.0 | — |
| 24 | 0/100/0 | — | 189.0 |
| 13 | 0/0/100 | 58.3 | 164.0 |
| 25 | 80/15/15 | 85.8 | 158.1 |
| 26 | 65/25/10 | 86.0 | 159.7 |
| 27 | 60/30/10 | 87.4 | 162.7 |

All of the blends were tested for oxygen permeability and selected ones were tested for permeability to moisture vapor. Results are presented in Tables VI and VII, respectively. For comparison, permeabilities for Barex 210 and polyethylene, Examples 1 and 20, were determined and reported.

TABLE VI

Oxygen Transmission Rate of Barex/Polyolefin Blends

| Ex. No. | Polymer | Composition | $O_2$ Transmission Rate (cm$^3$ mil/100 in$^2$, 24 hrs, atm) |
|---|---|---|---|
| 1 | B-210 | 100 | 0.8 |
| 20 | PE | 100 | 188.4 |
| 2 | B-210/PEMA | 95/5 | 0.52 |
| 3 | B-210/PEMA | 90/10 | 0.695 |
| 4 | B-210/PEMA | 75/25 | 0.15 |
| 5 | B-210/PEMA | 50/50 | 0.0 |
| 6 | B-210/PEMA | 25/75 | 0.336 |
| 21 | B-210/PEMA/PE | 80/10/10 | 0.8 |
| 22 | B-210/PEMA/PE | 10/10/80 | 108.6 |

As the results in Table VI indicate, the oxygen transmission rate for B-210/PEMA blends is actually better than that of the unblended B-210 copolymer which already possesses excellent resistance to oxygen transmission. In Example 21, it is seen that the oxygen transmission rate of B-210 copolymer is retained in compositions containing 80 percent nitrile polymer and only 10 percent PEMA, with 10 percent polyethylene. Also, in Example 22, where only 10 percent of the blend comprised the nitrile polymer, the transmission rate, compared against unblended polyethylene, was reduced by almost 58 percent.

TABLE VII

Water Vapor Transmission Rate of Barex/Polyolefin Blends

| Ex. No. | Polymer | Composition | Water Vapor Transmission Rate (g mil/100 in$^2$, 24 hrs, atm) |
|---|---|---|---|
| 1 | B-210 | 100 | 7 |
| 20 | PE | 100 | 0.4 |
| 21 | B-210/PEMA/PE | 80/10/10 | 5.8 |
| 22 | B-210/PEMA/PE | 10/10/80 | 1.1 |

As the results in Table VII indicate, the water vapor transmission rate for a blend containing 10 percent of nitrile copolymer was significantly reduced by the addition of polyethylene, compared against the unblended nitrile copolymer.

In conclusion, the blends comprising a high acrylonitrile polymer and polyethylene functionalized with maleic anhydride (PEMA) were miscible over their entire range of composition. Additionally, outstanding oxygen barrier properties were obtained from these particular blends over their entire range of composition. Blends comprising a high nitrile polymer with other functionalized polyolefins such as PE-g-MA, PP-g-MA and PP-g-AcA also exhibited compatibility, albeit limited.

The ternary blends, containing unfunctionalized polyethylene and polypropylene also exhibited improved compatibility for certain compositions. Moreover, for these ternary blends, the excellent oxygen transmission rate of B-210 is maintained at levels of 80 percent B-210 and 20 percent polyolefin/functionalized polyolefin. Finally, a significant improvement in the oxygen transmission rate over a polyolefin, PE for example, was obtained by using as little as 20 percent B-210/PEMA with 80 percent polyolefin. A modest improvement in water vapor transmission rate for B-210/PEMA/PE at 80/10/10 was also achieved over B-210 alone, while the water transmission rate for the polyolefin was not adversely affected by reducing the polyolefin content to 80 percent with addition of 20 percent B-210/PEMA.

Besides the improvements to the polyolefin properties, a further advantage of the present invention is that polyolefins and unsaturated functional compounds are inexpensive and available and, therefore, the development of high nitrile/polyolefin blends should lead to low cost barrier resins.

Thus, it should be clear from the foregoing examples and specification disclosure that the polymer blends of the present invention exhibit improved physical properties as compared to the separate properties of the additive polyolefins and the high nitrile polymers in the unblended state. Films prepared from these polymer blends display the ability to restrict the passage of gases, vapors and organic liquids and, therefore, have importance in the food packaging industry and related applications. Compatibility of the films is also enhanced which allow for the manufacture of multilayer structures. By blending, it is possible to incorporate lower cost polymers with more expensive barrier resins or to improve certain properties of the barrier resins by the addition of a functionalized polyolefin having the desired property.

It is to be understood that the use of polyolefins having functionality is not limited to those functionalized by copolymerization, e.g., PEMA or by grafting, e.g., PE-g-MA and PP-g-AcA as exemplified herein or to the specific high nitrile polymer exemplified herein, or by the disclosure of typical polyolefins and unsaturated monomers provided herein, the examples having been provided merely to demonstrate practice of the subject invention. Those skilled in the art may readily select other polyolefins and copolymers and high nitrile polymers according to the disclosure made hereinabove. Similarly, practice of the method of the present invention should not be limited to the particular steps of functionalizing the polyolefin that have been disclosed.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A polymer blend comprising:
   from about 1 to 99 parts by weight of a high nitrile polymer containing more than about 50 percent by weight nitrile polymer and produced by polymerizing a major proportion of a monounsaturated nitrile, a minor proportion of another monovinyl monomer copolymerizable therewith optionally in the presence of a diene rubber; and from about 99 to 1 parts by weight of a polyolefin, prepared from a monoolefin having from 2 to about 6 carbon atoms and functionalized with an unsaturated compound selected from the group consisting of unsaturated carboxylic acids, esters, anhydrides and imides.

2. A polymer blend, as set forth in claim 1, wherein said high nitrile polymer is prepared by the polymerization of 100 parts by weight of (A) from 60 percent to 90 percent by weight of at least one nitrile having the structure

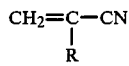

wherein R is hydrogen, a lower alkyl group having from 1 to 4 carbon atoms, or a halogen, and (B) from 10 percent to 40 percent by weight based on the combined weights of (A) and (B) of at least one member selected from the group consisting of (1) an an ester having the structure

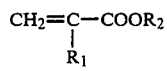

wherein $R_1$ is hydrogen, an alkyl group having from 1 to 6 carbon atoms, or a halogen, and $R_2$ is an alkyl group having from 1 to 30 carbon atoms, (2) an alpha-olefin having the structure

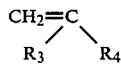

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure

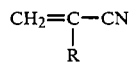

wherein R has the foregoing designation, and an ester having the structure

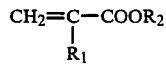

wherein $R_1$ and $R_2$ have the foregoing respective designations, said rubbery polymer containing from 50 percent to 100 percent by weight of polymerized conjugated diene and from 0 percent to 40 percent by weight of comonomer.

3. A polymer blend, as set forth in claim 1, wherein said functionalized polyolefin is poly(ethylene-g-maleic anhydride).

4. A polymer blend, as set forth in claim 3, wherein said high nitrile polymer comprises a copolymer of acrylonitrile and methyl acrylate grafted onto a preformed rubbery copolymer comprising butadiene and acrylonitrile.

5. A polymer blend, as set forth in claim 4, further comprising from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with an attendant decrease in the amount of at least one of the other polymer components to form 100 parts by weight of said blend.

6. A polymer blend, as set forth in claim 5, comprising poly(acrylonitrile-methyl methacrylate-butadiene)/poly(ethylene-g-maleic anhydride)/polyethylene.

7. A polymer blend, as set forth in claim 1, wherein said functionalized polyolefin is poly(propylene-g-maleic anhydride).

8. A polymer blend, as set forth in claim 7, wherein said high nitrile polymer comprises a copolymer of acrylonitrile and methyl methacrylate grafted onto a preformed rubbery copolymer comprising butadiene and acrylonitrile.

9. A polymer blend, as set forth in claim 8, further comprising from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with an attendant decrease in the amount of at least one of the other polymer components to form 100 parts by weight of said blend.

10. A polymer blend, as set forth in claim 1, wherein said functionalized polyolefin is poly(propylene-g-acrylic acid).

11. A polymer blend, as set forth in claim 10, wherein said high nitrile polymer comprises a copolymer of acrylonitrile and methyl methacrylate grafted onto a preformed rubbery copolymer comprising butadiene and acrylonitrile.

12. A polymer blend, as set forth in claim 11, further comprising from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with an attendant decrease in the amount of at least one of the other polymer components to form 100 parts by weight of said blend.

13. A polymer blend, as set forth in claim 12, comprising poly(acrylonitrilemethyl acrylate-butadiene)/poly(propylene-g-acrylic acid) /polypropylene.

14. A polymer blend, as set forth in claim 1, further comprising at least 1 percent by weight of a drying agent per 100 parts by weight of polymer.

15. A polymer blend having improved gas barrier properties comprising:

from about 1 to 99 parts by weight of a high nitrile polymer containing more that about 50 percent by weight nitrile polymer and produced by polymerizing a major portion of a monounsaturated nitrile, a minor proportion of another monovinyl monomer copolymerizable therewith optionally in the presence of a diene rubber, produced by polymerizing a major portion of a monounsaturated nitrile, a minor proportion of another monovinyl monomer copolymerizable therewith optionally in the presence of a diene rubber; and from about 99 to 1 parts by weight of poly(ethylene-co-maleic anhydride).

16. A polymer blend, as set forth in claim 15, wherein said high nitrile polymer is prepared by the polymerization of 100 parts by weight of (A) from 60 percent to 90 percent by weight of at least one nitrile having the structure

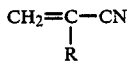

wherein R is hydrogen, a lower alkyl group having from 1 to 4 carbon atoms, or a halogen, and (B) from 10 percent to 40 percent by weight based on the combined weights of (A) and (B) of at least one member selected from the group consisting of (1) an ester having the structure

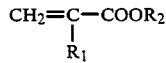

wherein $R_1$ is hydrogen, an alkyl group having from 1 to 6 carbon atoms, or a halogen, and $R_2$ is an alkyl group having from 1 to 30 carbon atoms, (2) an alpha-olefin having the structure

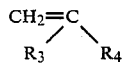

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure

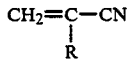

wherein R has the foregoing designation, and an ester having the structure

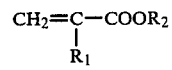

wherein $R_1$ and $R_2$ have the foregoing respective designations, said rubbery polymer containing from 50 percent to 100 percent by weight of polymerized conjugated diene and from 0 percent to 40 percent by weight of comonomer.

17. A polymer blend, as set forth in claim 16, wherein said high nitrile polymer comprises a copolymer of acrylonitrile and methyl methacrylate grafted onto a preformed rubbery copolymer comprising butadiene and acrylonitrile.

18. A polymer blend, as set forth in claim 17, further comprising from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with an attendance decrease in the amount of at least one of the other polymer components to form 100 parts by weight of said blend.

19. A polymer blend, as set forth in claim 18, comprising from about 10 to 80 parts by weight of an unfunctionalized polyolefin as said ternary polymer.

20. A polymer blend, as set forth in claim 19, comprising poly(acrylonitrilemethyl acrylate-butadiene)/poly(ethylene-co-maleic anhydride)/polyethylene.

21. A polymer blend, as set forth in claim 15, further comprising at least 1 percent by weight of a drying agent per 100 parts by weight of polymer.

22. A method for forming blends of polyolefins with high nitrile polymers containing more than about 50 percent by weight nitrile polymer and produced by polymerizing a major portion of a monounsaturated nitrile, a minor proportion of another monovinyl monomer copolymerizable therewith optionally in the presence of a diene rubber, comprising the steps of:

functionalizing a polyolefin prepared from a monoolefin having from 2 to about 6 carbon atoms with an unsaturated compound selected from the group consisting of unsaturated carboxylic acids, esters, anhydrides and imides; and blending from about 99 to 1 parts by weight of said functionalized polyolefin with from about 1 to 99 parts by weight of said high nitrile polymer.

23. A method, as set forth in claim 22, wherein said step of functionalizing includes the step of forming a copolymer of said polyolefin and said unsaturated compound.

24. A method, as set forth in claim 22, wherein said step of functionalizing includes the step of grafting said unsaturated compound onto said polyolefin.

25. A method, as set forth in claim 22, wherein said step of blending includes the steps of dissolving said high nitrile polymer and said functionalized polyolefin in a mutual solvent to form a solution;

mixing said solution at ambient temperature and pressure for about 1 to 6 hours; and thereafter evaporating said solvent and recovering said polymer blend.

26. A method, as set forth in claim 22, wherein said step of blending comprises
melt blending said high nitrile polymer and functionalized copolymer in a suitable apparatus at a temperature sufficient to melt both polymer components.

27. A method, as set forth in claim 22, wherein said high nitrile polymer is prepared by the steps of
polymerizing 100 parts by weight of (A) from 60 percent to 90 percent by weight of at least one nitrile having the structure

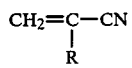

wherein R is hydrogen, a lower alkyl group having from 1 to 4 carbon atoms, or a halogen, and (B) from 10 percent to 40 percent by weight based on the combined weights of (A) and (B) of at least one member selected from the group consisting of (1) an ester having the structure

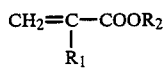

wherein R1 is hydrogen, an alkyl group having from 1 to 6 carbon atoms, or a halogen, and R2 is an alkyl group having from 1 to 30 carbon atoms, (2) an alpha-olefin having the structure

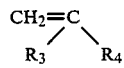

wherein R3 and R4 are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure

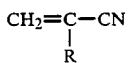

wherein R has the foregoing designation, and an ester having the structure

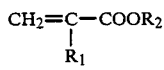

wherein R1 and R2 have the foregoing respective designations, said rubbery polymer containing from 50 percent to 100 percent by weight of polymerized conjugated diene and from 0 percent to 40 percent by weight of comonomer.

28. A method, as set forth in claim 27, including the further step of
blending from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with said functionalized polyolefin and said high acrylonitrile copolymer and an attendant decrease in the amount of at least one of the other polymer components to form 100 parts by weight of said blend.

29. A method, as set forth in claim 22, wherein said functionalized polyolefin is poly(ethylene-co-maleic anhydride) and said high nitrile polymer comprises poly(acrylonitrile-methyl acrylate-butadiene), including the additional step of
blending from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with said functionalized polyolefin and said high acrylonitrile copolymer and an attendant decrease in the amount of at least one of the other polymer components to form 100 parts by weight of said blend.

30. A method, as set forth in claim 22, wherein said functionalized polyolefin is poly(ethylene-g-maleic anhydride) and said high nitrile polymer comprises poly(acrylonitrile-methyl acrylate-butadiene), including the additional step of
blending from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with said functionalized polyolefin and said high nitrile polymer and an attendant decrease in the amount of at least one of the other polymer components to form 100 parts by weight of said blend.

31. A method, as set forth in claim 22, wherein said functionalized polyolefin is poly(propylene-g-maleic anhydride) and said high nitrile polymer comprises poly(acrylonitrile-methyl acrylate-butadiene), including the additional step of
blending from about 5 to 95 parts by weight of a ternary polymer selected from the group consisting of polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with said functionalized polyolefin and said high nitrile polymer and an attendant decrease in the amount of at least one of the other polymer components to form 100 parts by weight of said blend.

32. A method, as set forth in claim 22, wherein said functionalized polyolefin is poly(propylene-g-acrylic acid) and said high nitrile polymer comprises poly(acrylonitrile-methyl acrylate-butadiene), including the additional step of blending from about 5 to 95 parts by weight of a ternary polymer selected from the group consisting of polyolefins having from 2 to about 6 carbon atoms and polyolefins having from 2 to about 6 carbon atoms and polyolefins having from 2 to about 6 carbon atoms that are functionalized with an unsaturated compound selected from the group consisting of unsaturated carboxylic acids, esters, anhydrides and imides, with said functionalized polyolefin and said high nitrile polymer and an attendant decrease in the amount of at least one of the other polymer components to form 100 parts of weight of said blend.

33. A method, as set forth in claim 22, including the additional step of adding a drying agent during said step in blending.

* * * * *